US005327641A

United States Patent [19]

Olsson

[11] Patent Number: 5,327,641

[45] Date of Patent: Jul. 12, 1994

[54] TOOL FOR POSITIONING TERMINALS IN AN ELECTRICAL CONNECTOR

[75] Inventor: Billy E. Olsson, New Cumberland, Pa.

[73] Assignee: The Whitaker Corporation, Wilmington, Del.

[21] Appl. No.: 33,682

[22] Filed: Mar. 16, 1993

Related U.S. Application Data

[62] Division of Ser. No. 925,357, Aug. 4, 1992, Pat. No. 5,231,759, which is a division of Ser. No. 716,447, Jun. 17, 1991, Pat. No. 5,157,827, which is a division of Ser. No. 502,941, Mar. 30, 1990, Pat. No. 5,100,342.

[51] Int. Cl.⁵ ....................... B23P 19/00; H01R 43/20

[52] U.S. Cl. ........................................ 29/747; 29/750; 29/755; 29/758

[58] Field of Search ................. 29/745, 747, 748, 750, 29/751, 752, 755, 758, 270

[56] References Cited

U.S. PATENT DOCUMENTS

| | | | |
|---|---|---|---|
| 3,239,918 | 2/1962 | Cobaugh | 29/867 |
| 3,545,606 | 12/1970 | Bennett et al. | 206/56 |
| 3,696,319 | 10/1972 | Olsson | 339/17 F |
| 3,946,477 | 3/1976 | Cobaugh et al. | 29/750 X |
| 4,127,935 | 12/1978 | Ammon | 29/629 |
| 4,195,893 | 4/1980 | Stupay | 339/14 R |
| 4,260,209 | 4/1981 | Zell et al. | 339/14 R |
| 4,380,118 | 4/1983 | Driver et al. | 29/747 |
| 4,475,284 | 10/1984 | Johnson | 29/747 X |
| 4,697,864 | 10/1987 | Hayes et al. | 439/444 |
| 4,717,354 | 1/1988 | McCleerey | 439/444 |
| 4,726,777 | 2/1988 | Billman et al. | 439/70 |
| 4,739,550 | 4/1988 | Schaeffer et al. | 29/750 X |
| 4,749,371 | 6/1988 | Hirai et al. | 439/497 |
| 5,092,029 | 3/1992 | Fisher et al. | 29/739 |
| 5,208,968 | 5/1993 | Camsell et al. | 29/758 X |

FOREIGN PATENT DOCUMENTS

| | | | |
|---|---|---|---|
| 2024539 | 1/1980 | United Kingdom | 439/751 |

*Primary Examiner*—Timothy V. Eley
*Attorney, Agent, or Firm*—Bruce J. Wolstoncroft; Anton P. Ness

[57] ABSTRACT

A high density connector for electrically connecting a high density cable to a matable electrical connector has a housing with a plurality of terminals provided therein. The terminals have sharp outer edges which enable the terminals to cooperate with a portion of the connector to provide the securing force required to retain the terminals in position. The positioning of the terminals in the housing is accurately controlled through the use of an alignment tool which is manufactured from a material which does not expand or contract when exposed to various environmental conditions. Therefore, the precise positioning of the terminals is guaranteed and is repeatable for many connectors.

5 Claims, 10 Drawing Sheets

TOOL FOR POSITIONING TERMINALS IN AN ELECTRICAL CONNECTOR

This application of a divisional of application Ser. No. 07/925,357 filed Aug. 4, 1992 now U.S. Pat. No. 5,221,759; which is a divisional of application Ser. No. 07/716,447 filed Jun. 17, 1991, now U.S. Pat. No. 5,157,827 which is a divisional of application Ser. No. 07/502,941 filed Mar. 30, 1990, now U.S. Pat. No. 5,100,342.

FIELD OF THE INVENTION

The invention is directed to a connector for terminating high density flat cable. In particular the high density flat cables are accurately positioned in the connector and terminated to the terminals without the use of conventional insulation displacement type terminations, thereby insuring that a much more reliable electrical connection will be effected.

BACKGROUND OF THE INVENTION

Connectors for the termination of flat flexible cable are well known in the industry. One example is disclosed in U.S. Pat. No. 3,696,319, entitled Flat Conductor Cable Connector. The connector disclosed teaches of a connector in which bared cable conductors of a flat conductor cable are bent around an insulating nose and the nose is inserted into a recess in a terminal carrying block so that each terminal engages a single conductor. The desired relationship between the terminals and nose, when fully inserted, is assured by a tang or stop which projects from the terminal into the path of the nose. Preferably the nose is provided with a plurality of ridges and valleys along its length so that the individual conductors lie in the valleys and are separated from adjacent conductors by ridges.

U.S. Pat. No. 4,749,371 shows another example of a connector for use with flat cable. The invention is characterized in that a contact housing having plural signal contact members and plural ground contact members are disposed alternately and in parallel one with another within the housing. Respective leading portions of the contact members are projected into an internal space formed at a rear portion thereof. A cable base is provided for connection to a flat cable comprising plural signal conductors and plural ground conductors which are disposed alternately and in parallel one with another. Respective naked end portions of the conductors are mounted at least along one of an upper and lower surface thereof and a bus bar is connected to the naked end portions of the ground conductors. By inserting the cable base into the internal space of the contact housing, a leading portion of each of the signal contact members may be brought into pressure contact with the end portion of the corresponding one of the signal conductors, and a leading portion of each of the ground contact members may be brought into contact with a part of the end portion of the corresponding one of the ground conductors that is in contact with the bus bar.

Although the prior art connectors described herein, and many other types, operate effectively to terminate ribbon cable which have sufficient spacing provided between the conductors, a problem arises when the spacing between the conductors is reduced. In particular, when the spacing between the conductors is in the range of 0.5 mm (0.0198 inches), the prior art connectors will not provide the electrical connection required.

It would therefore prove advantageous to provide an electrical connector in which the spacing of the terminals did not depend upon the molding tolerances of the connector. This would insure that the spacing of the terminals would correspond to the spacing of the conductors in the cable, thereby providing a positive electrical connection therebetween.

SUMMARY OF THE INVENTION

The invention is directed to an electrical connector for electrically connecting a first electrical component to a second electrical component. The electrical connector has a housing with a first major surface and a second major surface. A recess is positioned in the housing and extends from the first major surface to the second major surface. A plurality of terminals are positioned in the recess. The terminals have retention portions with sharp outer edges which cooperate with securing means of the housing to position and maintain the terminals within the recess. Whereby, as the terminals are inserted into the recess, the sharp outer edges cooperate with the securing means to displace portions of the securing means.

A method of inserting the terminals into the housing is also described. The terminals are positioned in terminal receiving grooves provided on an insertion tool. The loaded tool is then aligned with a recess provided in the housing. The insertion tool and terminals are inserted into the recess of the housing and the terminals are removed from the insertion tool. The terminals are secured to the housing such that the spacing provided between the terminals is maintained, insuring that the center line spacing of the terminals is accurately controlled.

DETAILED DESCRIPTION OF THE INVENTION

Figure 1:
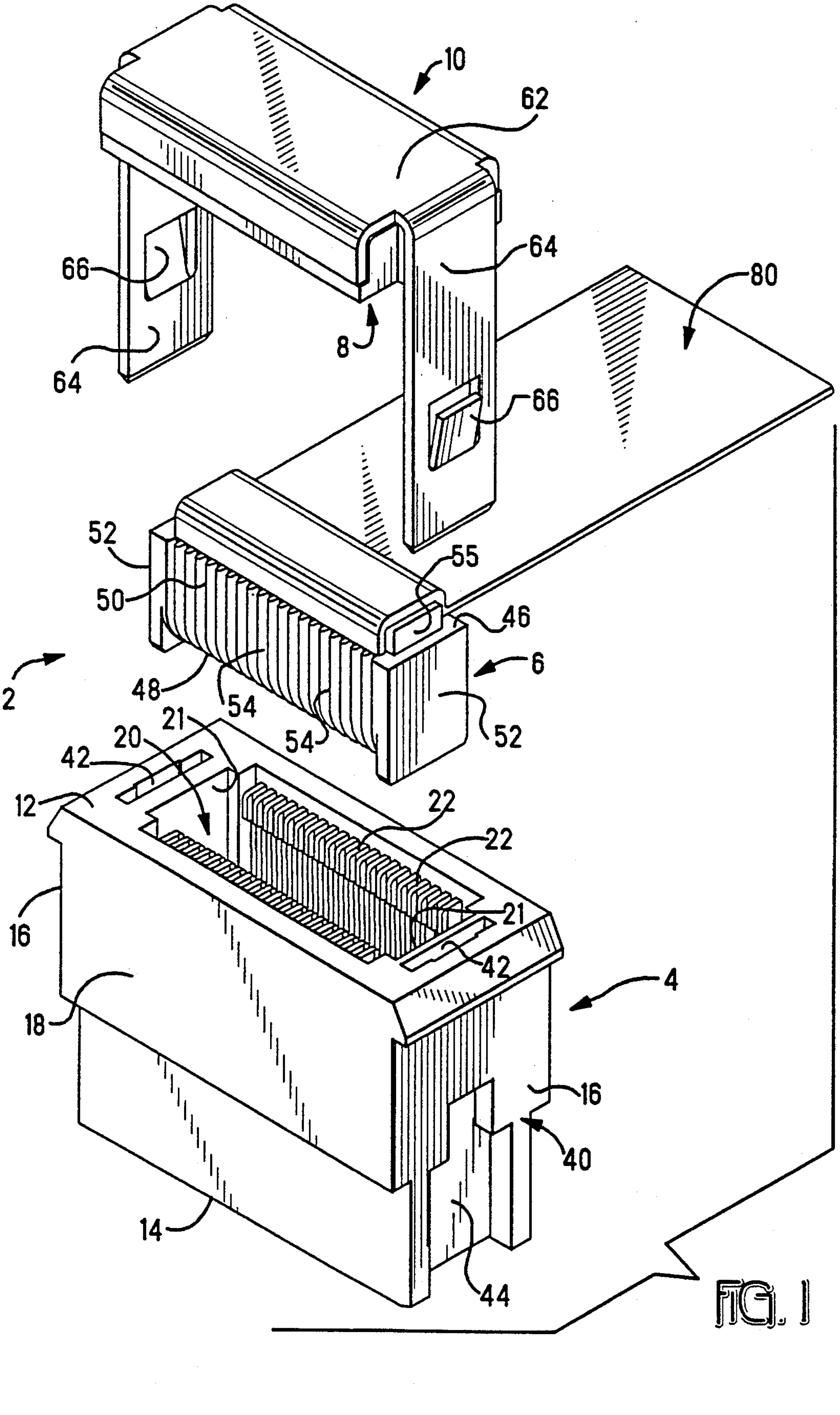
FIG. 1 is a perspective view of a connector according to the present invention, a cable alignment bar and a strain relief member are exploded from the housing of the connector.
Figure 2:
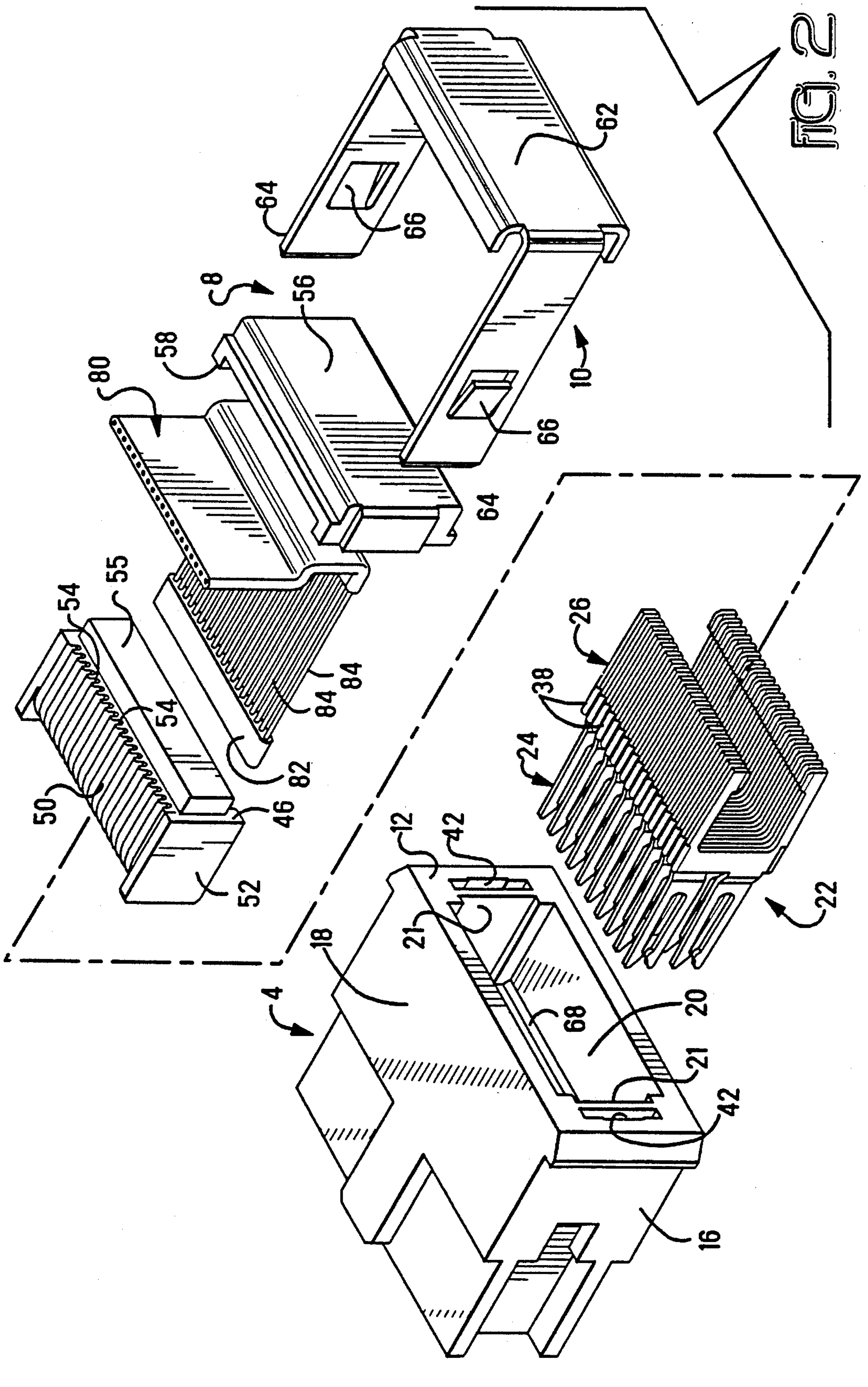
FIG. 2 is an exploded perspective view of the connector assembly, similar to that of FIG. 1, with terminals and a cable exploded from respective portions of the connector assembly.

As best illustrated in FIG. 1 and 2, cable receiving connector assembly 2 has a housing 4, a molded alignment bar 6, a molded liner 8, and a strain relief member 10. The housing 4 has a first major surface 12 and an oppositely facing second major surface 14. End walls 16 and side walls 18 extend from the first major surface 12 to the second major surface 14. A recess 20 is positioned in the housing 4, and extends from the first major surface 12 toward the second major surface 14. The recess 20 is dimensioned to receive a plurality of terminals 22 therein, as will be more fully discussed. Positioned at either end of the recess 20, are channels 21.

Figure 3:
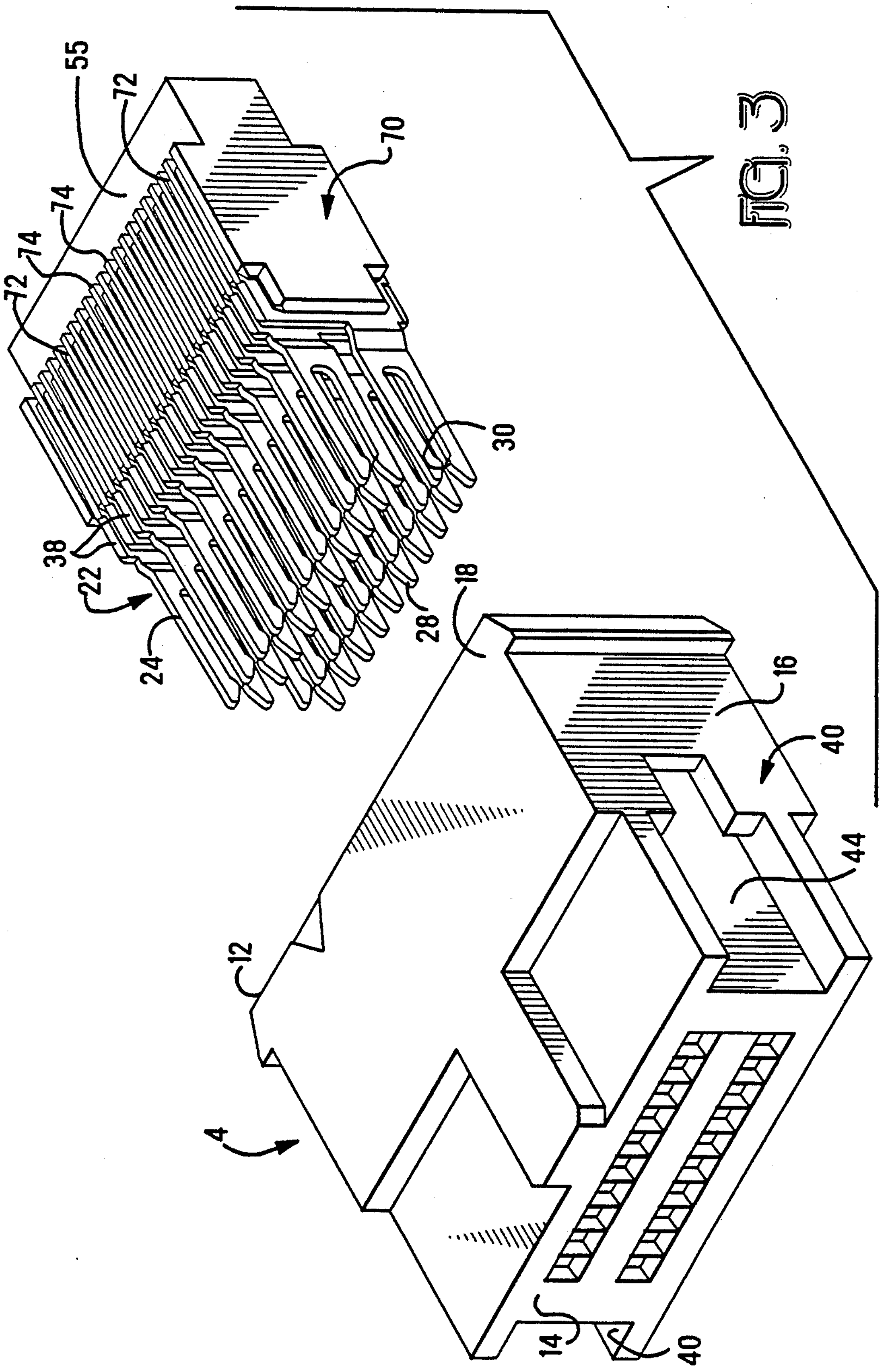
FIG. 3 is a perspective view of the terminals positioned on an alignment tool just prior to the terminals and alignment tool being inserted into the housing of the connector assembly.
Figure 8:
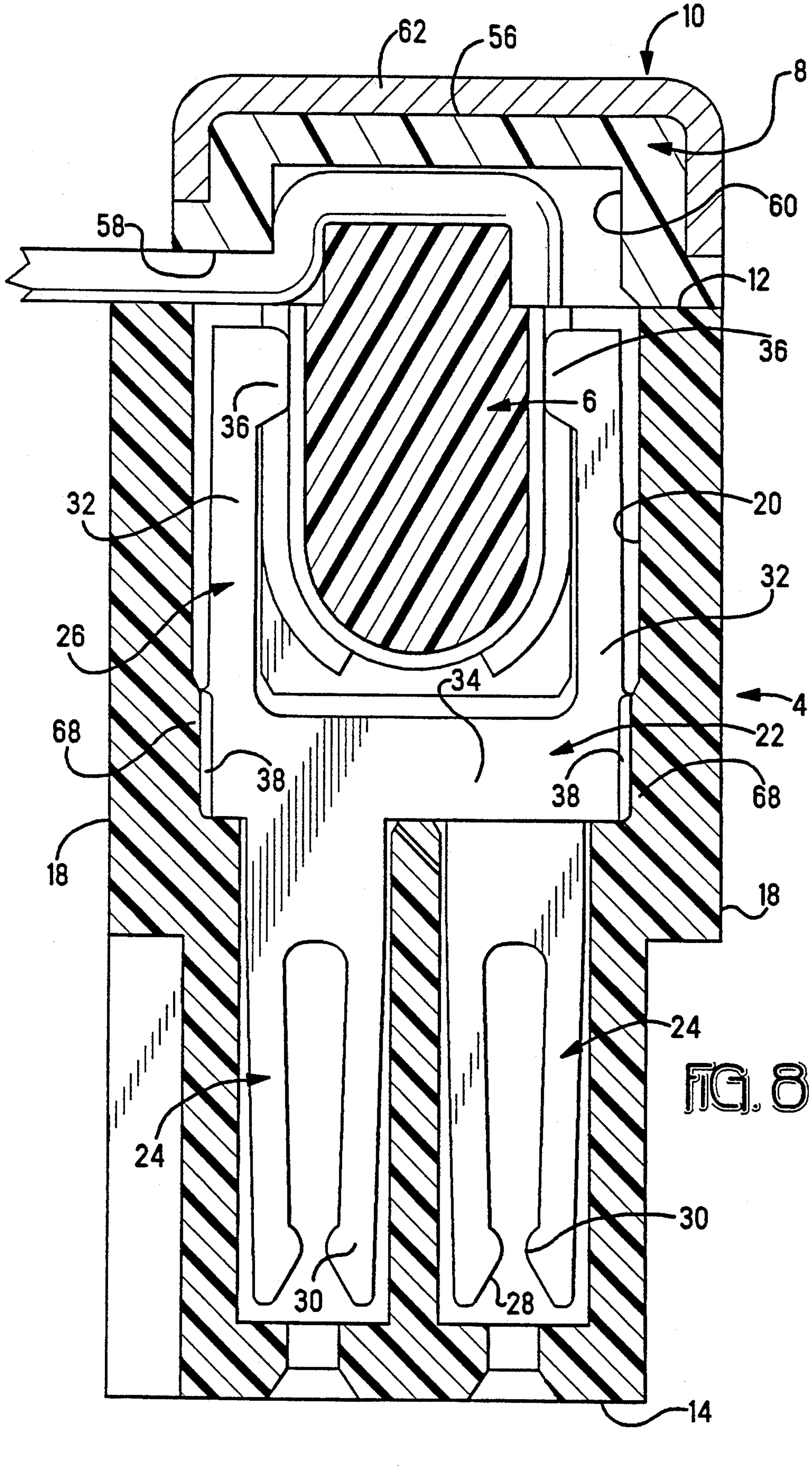
FIG. 8 is a cross-sectional view of a fully assembled connector assembly.

The terminals 22, as best shown in FIG. 8, have pin receiving sections 24 and cable receiving sections 26. The pin receiving sections 24 are provided proximate the second major surface 14 when the terminals are inserted into the housing. Lead-in surface 28 and contact areas 30 cooperate with a pin of a mating connector to insure that the terminals 22 are placed in electrical engagement with the pins of the mating connector. The cable receiving sections 26 have generally U-shaped configurations, with resilient arms 32 extending from the base portions 34 in a direction toward the first major surface 12. Provided proximate the free ends of the resilient arms 32 are contact portions 36. The contact portions 36 extend inward from the resilient arms 32, as shown in FIG. 8. Base portions 34, as best shown in FIG. 3, have sharp outer edges 38. These outer edges cooperate with the dielectric material of the housing 4 to maintain the terminals 22 in position relative to the housing 4, as will be more fully discussed. It should be noted that in the particular embodiment shown, the terminals 22 are 0.010 inches thick and the center line spacing between terminals is 0.01968 inches.

Referring to FIGS. 1 and 2, strain relief retention sections 40 are provided on either end wall 16 of the housing 4. The strain relief sections 40 have openings 42 which extend from the first major surface 12 of the housing toward the second major surface 14. Recesses 44 are positioned adjacent to the openings 42, and cooperate therewith.

Alignment bar 6 is dimensioned to be received in the recess 20 of the housing 4. The alignment bar has a first surface 46 and a generally rounded second surface 48. Side walls 50 and end walls 52 extend from the first surface 46 to the second surface 48. Conductor receiving recesses 54 extend from the first surface 46, along a respective side surface, across the rounded second surface 48, and back toward the first surface, to form recesses into which the individual conductors of the cable can be manipulated and retained in position. Portions of the dividing walls between the conductor receiving recesses 54 have been removed along the .rounded second surface 48 to form a channel 51 (FIG. 5) along the length of the alignment bar 6. Each end wall 52 is configured to be accepted into the cavities 21 provided on the housing 4, thereby providing the means required to insure that the ribbon cable remains in electrical engagement with the terminals of the connector.

The first surface 46 has a bar projection 55 which extends therefrom. The bar projection 55 extends in a direction away from the second surface 48, and cooperates with the cable when the cable is inserted onto the alignment bar.

The molded liner 8, as best shown in FIGS. 2 and 8, has a relatively flat upper surface 56 and a lower surface 58 which has a recess 60 provided therein. The recess is dimensioned to allow the bar projection 54 to be provided therein.

The strain relief member 10 (FIGS. 1 and 2) is made of stainless steel or some other material having the strength characteristics required. The strain relief member has a hold down plate 62 which has locking arms 64 which extend from opposed ends thereof. The locking arms 64 have resilient securing projections 66 which are provided thereon.

As was earlier stated, the spacing provided between the terminals is minimal due to the fact that the spacing of the conductors of the cable can be as close as 0.5 mm (0.01968). Consequently, the standard method of positioning the terminals in the housing is not adequate. Typically, the terminals are cut from a carrier strip and pushed into terminal receiving grooves provided about the edges of the cable receiving recess. The terminals receiving grooves are separated by molded dividers which serve to align the terminals, thereby insuring that the terminals are properly positioned relative to the housing. However, when the center line spacing of the terminals is 0.01968 of an inch, and the terminals are 0.010 of an inch thick, only 0.009 of an inch is left for the thickness of the divider. In this limited space, it is practically impossible to mold dividers which extend from the first major surface of the housing to the second major surface. Therefore, an alternate means of aligning and spacing the terminals is required.

Figure 4A:
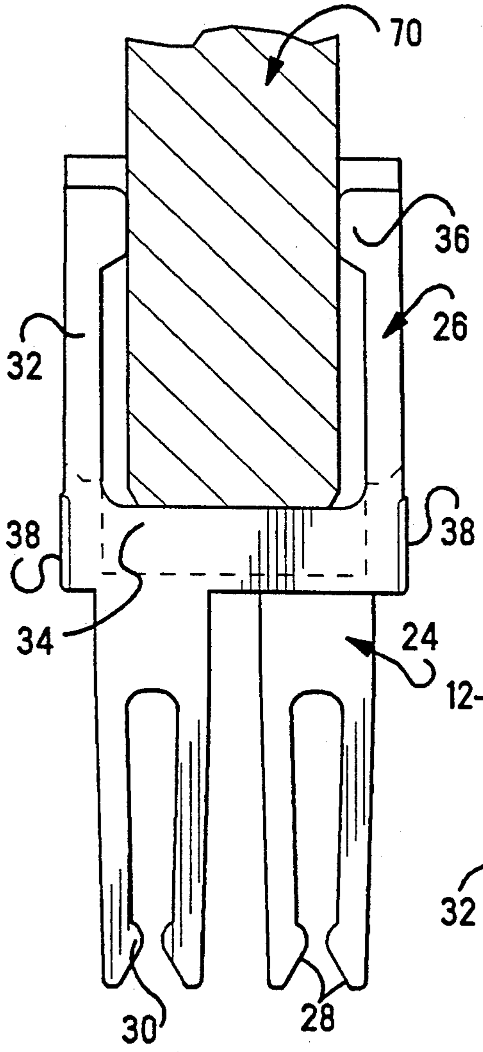
FIG. 4A is a cross-sectional view of the alignment tool showing respective terminals in engagement with the alignment tool.
Figure 4B:
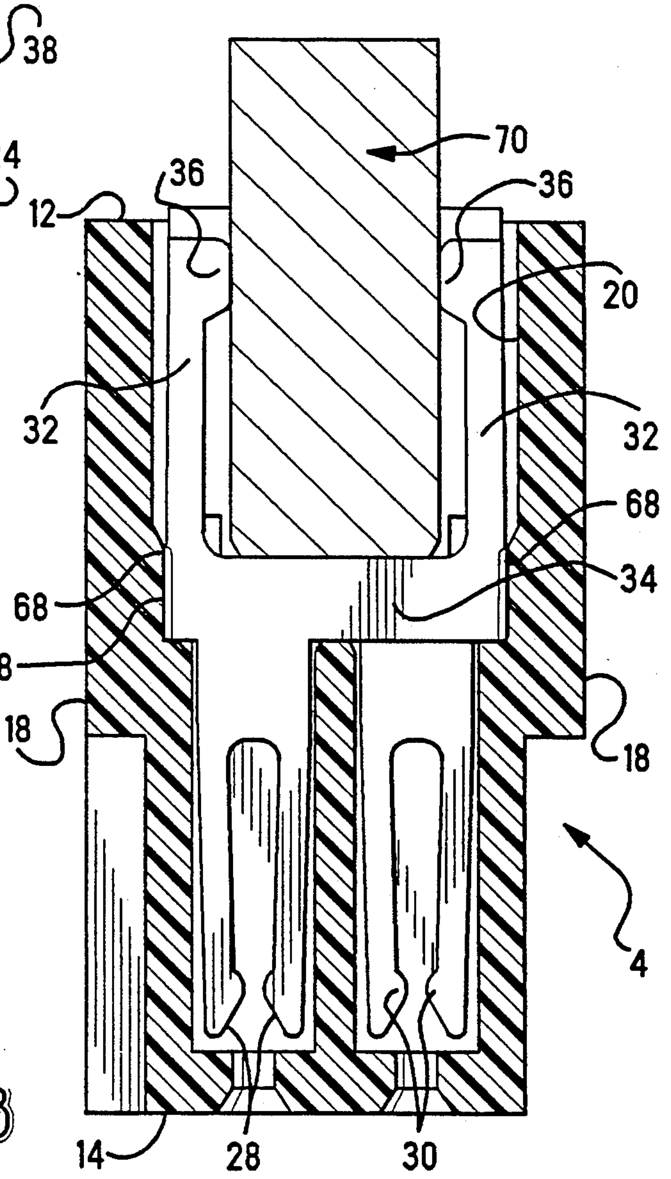
FIG. 4B is a cross-sectional view similar to that of FIG. 4A showing the respective terminals and alignment tool inserted into a recess of the housing.

In order to accomplish the precise spacing of the terminals, the terminals 22 are removed from the carrier strip and placed in an alignment tool 70, as best shown in FIGS. 3, 4A, and 4B. The alignment tool 70 is made from precision ground steel or other material in which the manufacturing tolerances can be held to a minimum. Tool 70 has a forward surface and a rearward surface, and side walls and end walls extending from the rearward surface to the forward surface. A plurality of grooves 72 and dividers 74 are defined on of the alignment tool 70 extending from the forward surface toward the rearward surface first to transverse bottom surfaces, and extending there beyond alongside the side surfaces and having axially disposed bottom surfaces and are divided by dividers 74 to cooperate with the terminals 22 when the terminals are positioned on the tool.

It is worth noting that the number of terminals required for a connector can vary depending upon the requirements of the system. However, as the expense of the alignment tool 70 can be significant, the manufacture of the various connectors should not require separate alignment tools. Therefore, the alignment tool can be constructed in a modular fashion, such that the appropriate number of grooves and dividers can be removed from the tool if a different connector size in to be employed.

Figure 9:
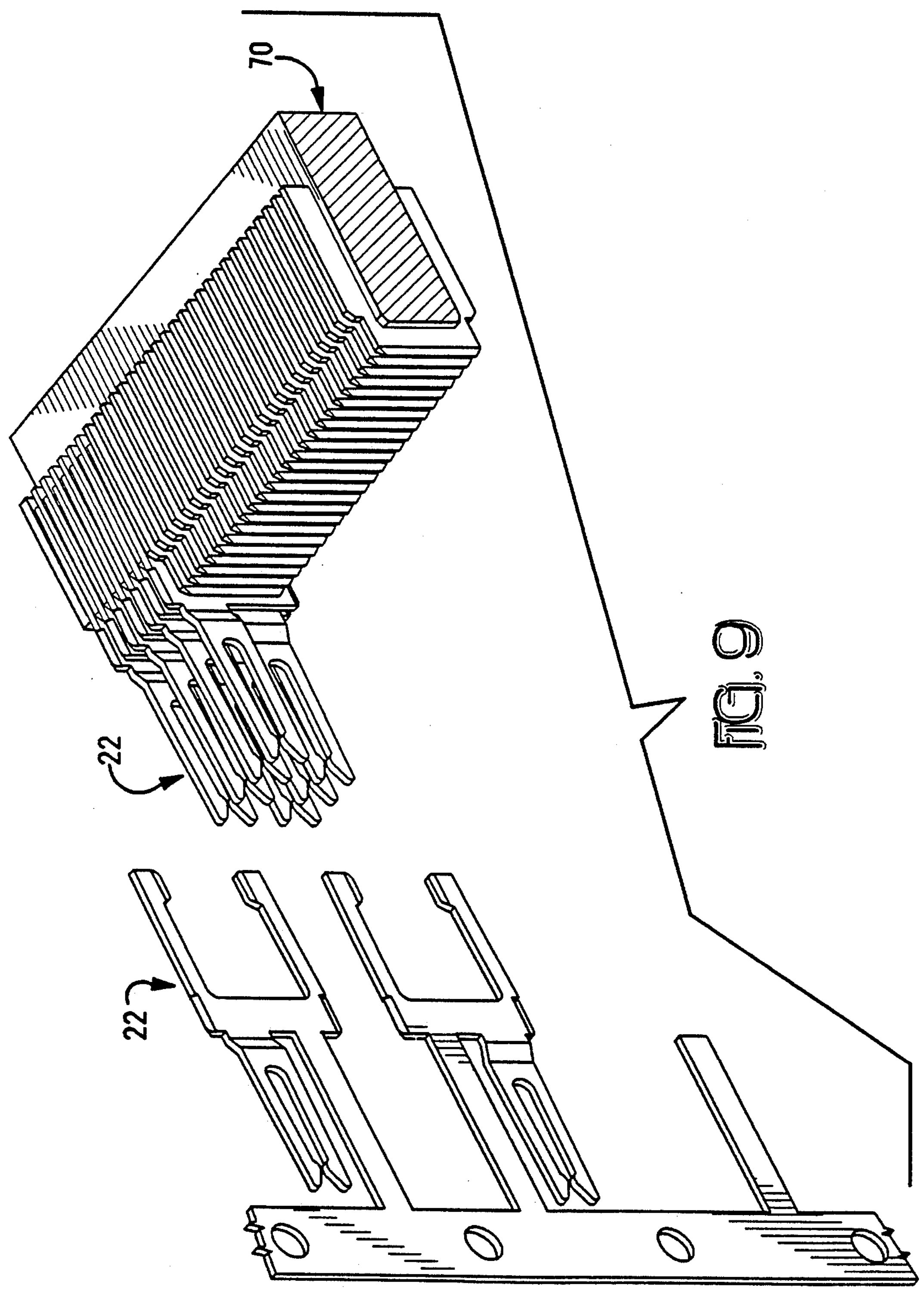
FIG. 9 is perspective view of the alignment tool with several terminals positioned thereon and a carrier strip positioned proximate the tool.
Figure 10:
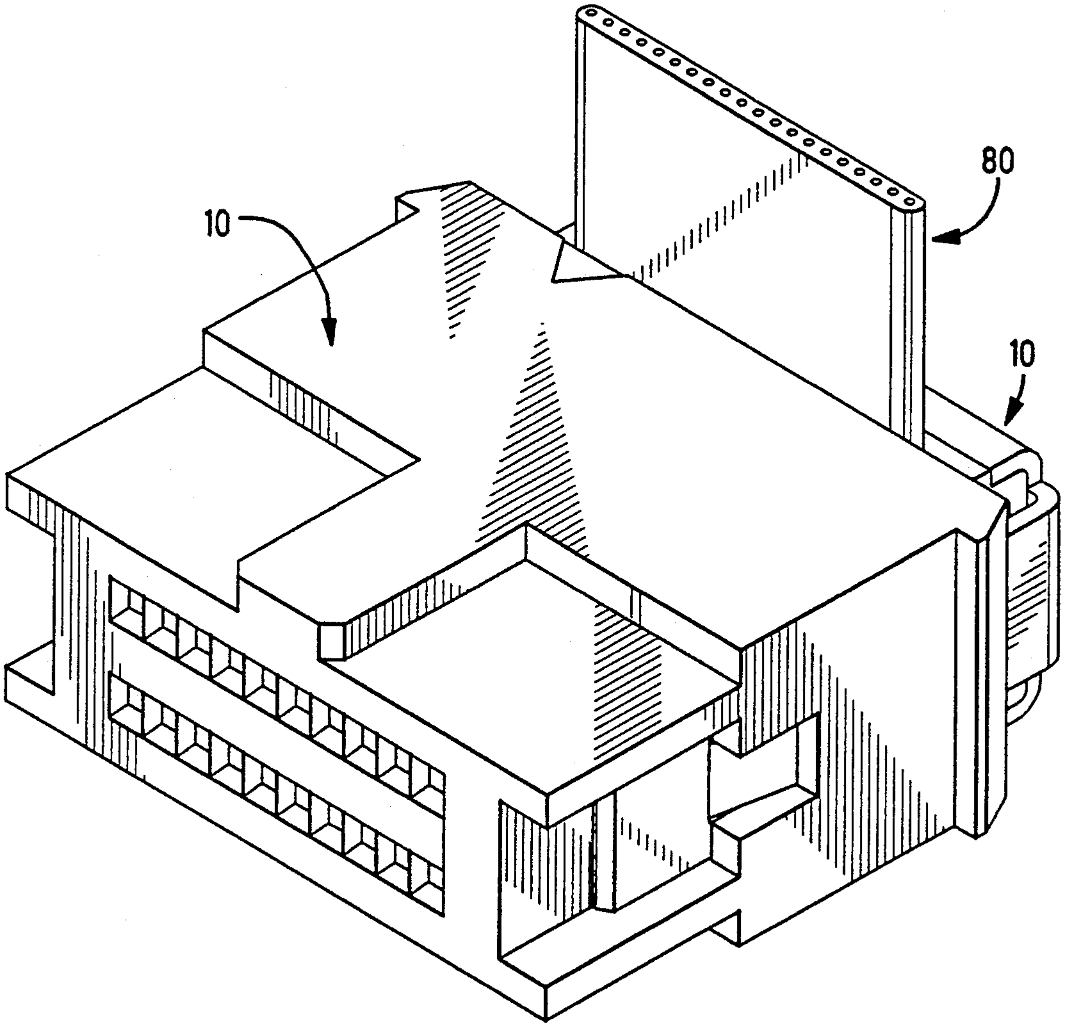
FIG. 10 is a perspective view of the fully assembled connector assembly before it is mated with a mating connector.

In operation, the terminals 22 are then moved into cooperation with the tool 70, and the terminals are severed from the carrier strip, as shown in FIG. 9. As the terminals 22 are inserted onto the tool 70, the contact portions 36 engage bottom surfaces of grooves or terminal receiving recesses 72, thereby creating a frictional engagement between the terminals and the tool which is of sufficient force to maintain the terminals on the tool. The configuration of the grooves 72 and dividers 74 insures that the terminals will be properly positioned. This positioning is insured because of the precise manufacturing of the tool.

As is shown in FIG. 9, the pin receiving sections 24 of the terminals 22 are offset from the carrier strip. The pin receiving sections are staggered to allow for insertion, as well as mating with a mating connector.

When the tool 70 is fully loaded with terminals 22, the tool is moved into the recess 20 of the housing 4, as is best shown in FIG. 4B. The tool is dimensioned to allow for easy insertion and withdraw of the tool from the recess.

As the tool 70 is moved into the recess 20, the outer edges 38 of the terminals 22 engage retention portions 68 of the housing 4. As the insertion continues, the sharp outer edges 38 are driven into retention portions 68, as best shown in FIG. 2. This is continued until the terminals are properly seated in the housing. In this position, the outer edges 38 are forced far enough into the retention portions 68 to provide the retention force required to insure that the terminals 22 are maintained in position. With the outer edges 38 positioned in the retention portions 68, the alignment tool 70 is withdrawn. As the retention force between the outer edges 38 of the terminals 22 and the retention portions 68 of the housing 4 is greater than the frictional engagement between the terminals and the tool, the terminals are retained in the housing as the tool is withdrawn. With the tool fully extracted, the tool is again loaded with terminals, and the process is repeated for the next housing.

Because of the use of the alignment tool, the positioning of the terminals in the housing is precisely controlled. Therefore, the connector can be molded in the ordinary way, without the need to provide fragile dividing walls between the terminal receiving recesses. This also insures that the price of the connector can be kept to a minimum.

The accuracy of the terminals in the housing is precise and repeatable. As the alignment tool has precision ground grooves or terminal receiving recesses, the precision of the grooves can be precisely manufactured such as approximately 0.02 inches. Also because of the material used, the tolerance range of the grooves is minimal, and therefore, the spacing of the terminals is identical for each connector. The precise and repeatable spacing of the terminals is extremely important when dealing with conductors which have small center line spacing and small conductor thicknesses. Consequently, because of the precision of the alignment tool, the spacing of the terminals is far superior to that of a connector which has the terminals aligned by molded recesses in the housing.

With the terminals 22 properly positioned in the housing 4, the alignment bar 6 is moved into the recess 20. However, before the alignment bar is moved into the recess, a respective cable 80 must be positioned and maintained on the alignment bar 6.

Figure 5:
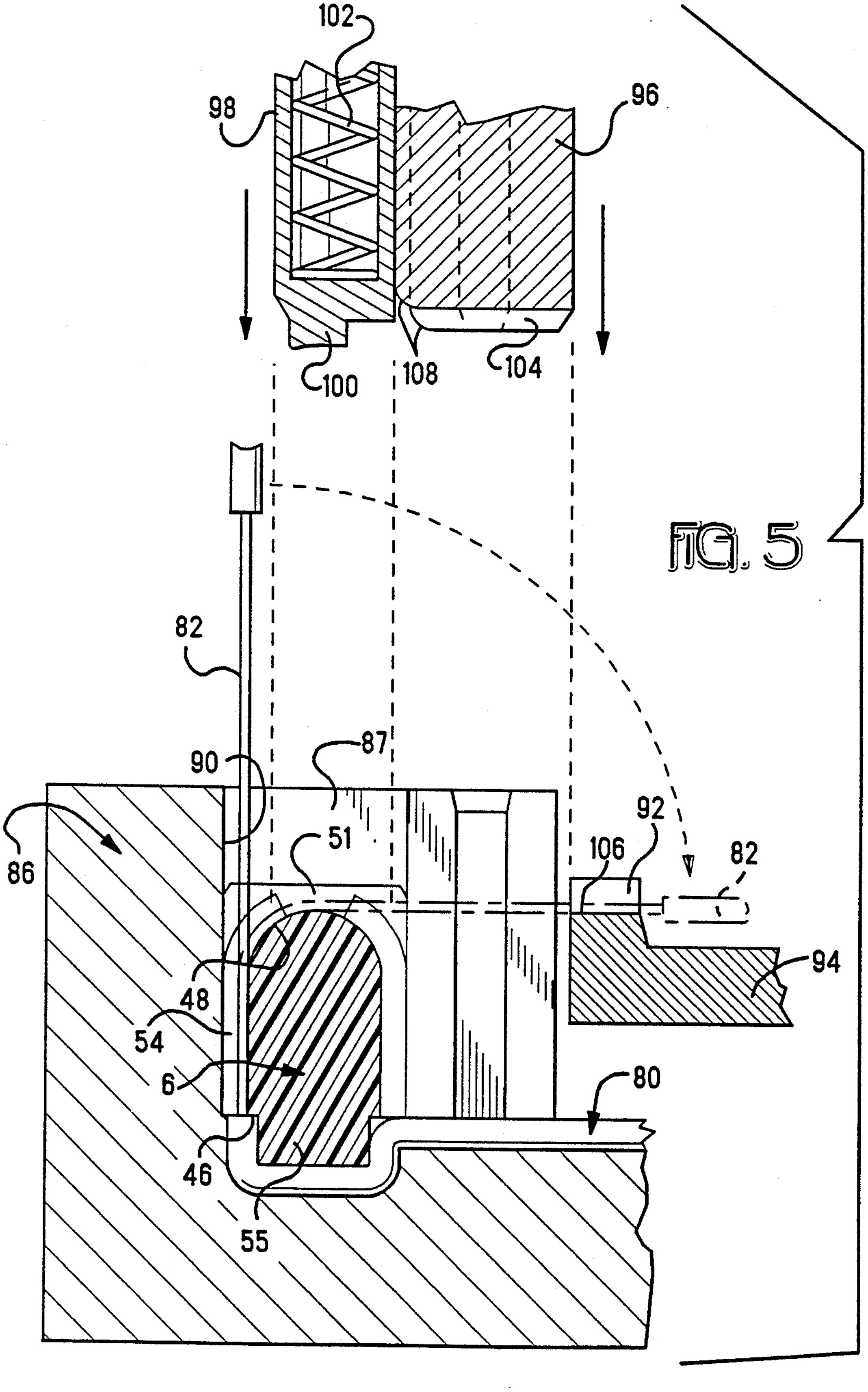
FIG. 5 is a cross-sectional view of a termination tool with an alignment bar and cable positioned in the initial position.
Figure 6:
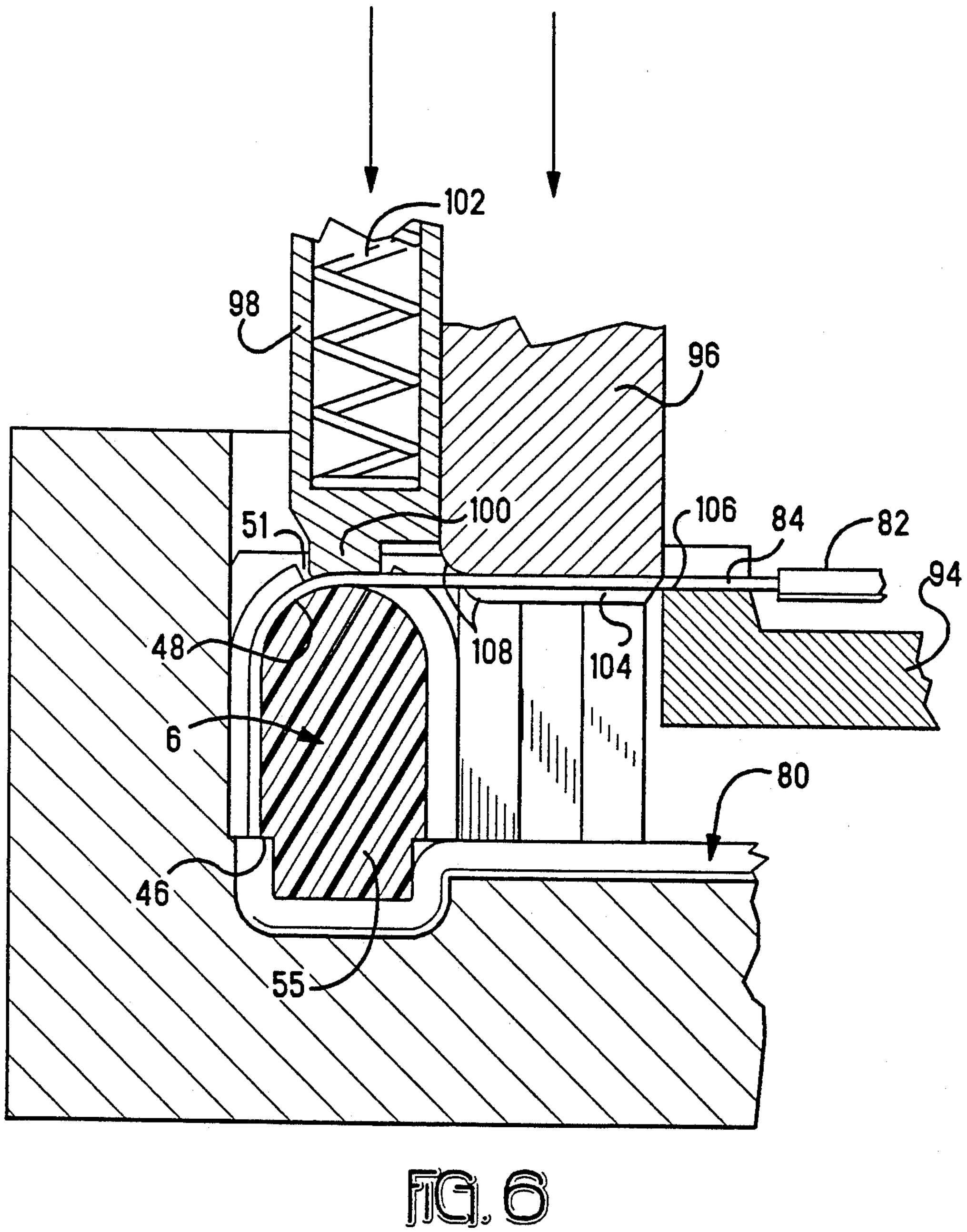
FIG. 6 is a cross-sectional view similar to that of FIG. 5, showing the termination tool in an intermediate position or cutting position.
Figure 7:
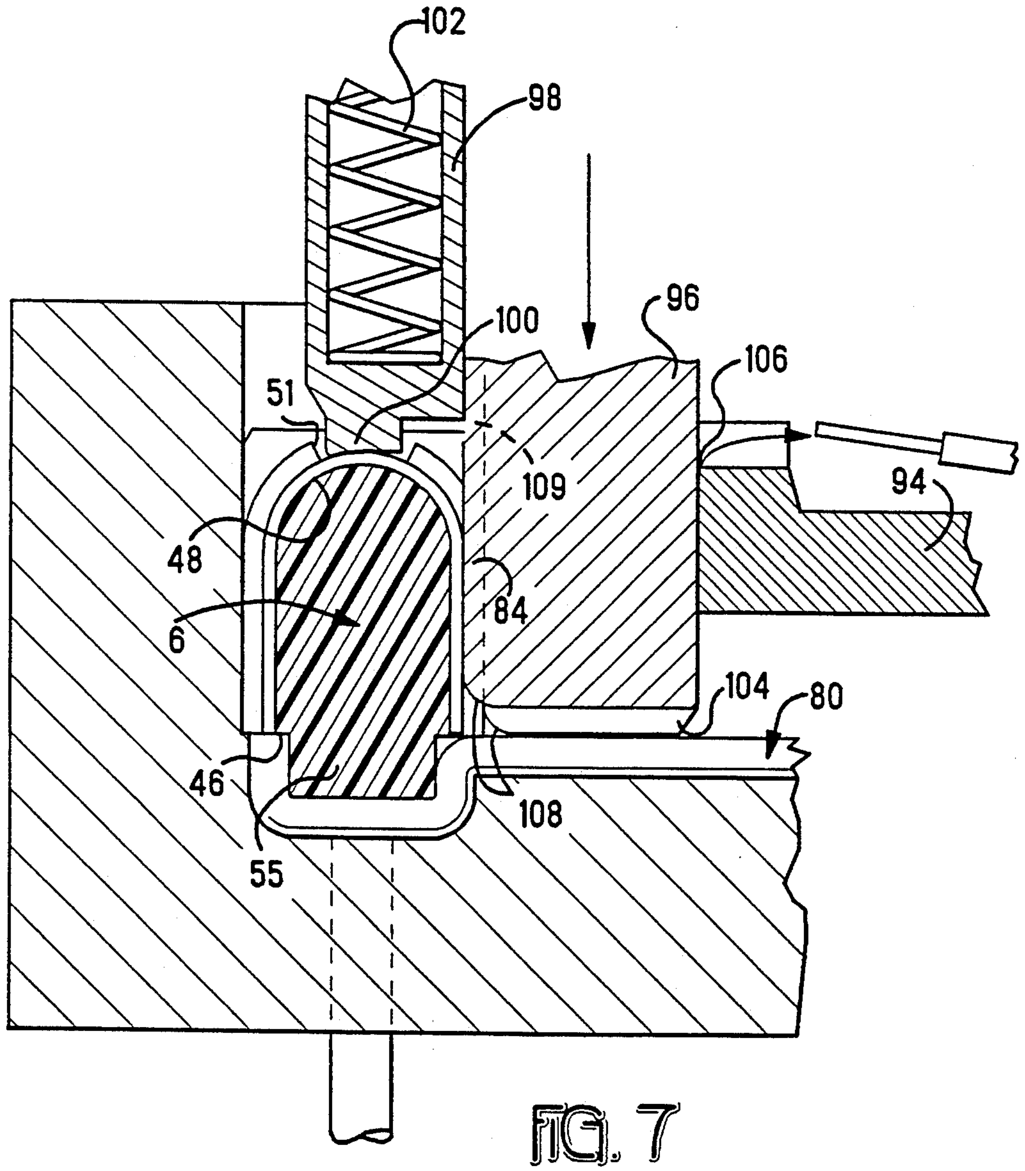
FIG. 7 is a cross-sectional view similar to that of FIG. 6, showing the termination tool in a final or termination position.

Referring now to FIGS. 5 through 7, the preparation and positioning of the cable 80 on the alignment bar will now be discussed. Ends 82 of the cable are stripped by means of laser burning or other known methods. As these methods are well known in the industry, a detailed description will not be provided. This type of process insures that residue will not be left between the stripped portions of the conductors of the cable.

With the end 82 of the cable prepared, the alignment bar 6 is moved into cooperation with the prepared end 82 of the cable, as is illustrated in FIG. 5. The configuration of the cable is obtained during the laser burning process, and consequently, no reworking of the cable takes place in this step. As is shown, the bar projection 55 of the alignment bar 6 is received within a bent portion of the cable. The exposed conductors 84 of the end 82 of the cable are positioned in a portion of the conductor receiving recesses 54, thereby insuring that the spacing required between the exposed conductor is maintained.

The preassembled subassembly of the alignment bar 6 and the cable 80 is then inserted into a recess 90 of a termination tool 86, as shown in FIG. 5. In order to insure for the proper alignment of the subassembly into the tool, the end walls 52 of the alignment bar 6 cooperate with pockets 87 of the termination tool to prevent the movement of the subassembly relative to the tool 86.

With the subassembly properly positioned and maintained in the recess 90 of the tool 86, the exposed portions of the conductors 84 which extend beyond the alignment bar 6 are bent approximately ninety degrees, as indicated by the dotted arrow in FIG. 5. The conductors 84 are bent until they rest in channel 92 of movable support arm 94.

A conductor driving member 96 and conductor support member 98 are moved into cooperation with the conductors 84. Initially members 96, 98 are moved in unity toward alignment bar 6, as shown in FIG. 5. This motion continues until a lead projection 100 of the conductor support member 98 engages the conductors 84 of the cable 80. As is shown in FIG. 6, the lead projection 100 is positioned in the cavity 51 of the alignment bar 6, thereby insuring that the lead projection 100 cooperates with the individual conductors 84, to maintain them in position in their respective conductor receiving recesses 54. With the conductor support member 98 provided in engagement with the conductors 84, the further downward motion of the member 98 is prevented. This is due to the fact that member 98 has a spring member 102 provided therein, which allows the conductor support member 98 to remain stationary relative to the alignment bar 6 as the conductor driving member 96 is advanced. The spring member 102 also insures that an adequate force will be supplied to the exposed conductors, to insure that the conductors 84 are retained in position relative to the alignment bar 6 as the termination process continues.

Referring to FIG. 6, the downward motion of the conductor driving member 96 is continued. This causes the conductor driving member 96 to engage the exposed conductors 84 of the cable 80. It is important to note that recesses 104 are provided on the leading edge of the member 96. The recesses 104 cooperate with the respective conductors 84 to insure for the proper position of the conductors as the termination process continues.

As the conductor driving member 96 is forced downward, the conductors 84 are also forced downward, as viewed in FIG. 7. This motion forces the conductors against a cutting edge 106 provided on the movable support arm 94. Consequently, as shown in FIG. 7 the extreme ends of the conductors 84 are severed from the cable.

The downward motion of the conductor driving member 96 is continued, causing the conductors to wrap around the alignment bar 6. Angled surface 108 of the conductor driving member 96 allows the conductors 82 to be easily wrapped about the bar 6. In order to insure that the conductors 82 are properly positioned in the conductor receiving recesses 54, channels 109 are provided on conductor driving member 96. These channels 109 are positioned to allow the dividing walls of the recesses 54 to be inserted therein. This allows the conductor driving member 82 to extend into recesses 54, thereby insuring that the conductors 96 will be properly positioned in the recesses, as shown in FIG. 7.

With the conductors 84 properly positioned about the alignment bar 6, the conductor driving member 96 is retracted. The conductor support member 98 is retained in cooperation with the conductors until the conductor driving member is completely removed from the ends of the conductors. This insures that the conductors will remain in position as the member 96 is retracted. Finally, the conductor support member 98 and the movable support arm 94 are moved from the alignment bar 6 and cable 80, thereby allowing the assembled cable and alignment bar subassembly to be removed from the tool.

The assembled cable and alignment bar subassembly is inserted into the recess 20 of the housing, as best shown in FIG. 8. The end walls 52 of the alignment bar 6 are received in the channels 21 of the recess 20 to insure that the alignment bar 6 is properly positioned in the recess 20 of the housing 4. As the bar 6 is into the recess 20, the contact portions 36 of the terminals 22 enter the conductor receiving recesses 54 of the bar 6. It should be noted that the resiliency of the arms 32 of the terminals is adequate to compensate for any slight misalignment between the terminals 22 and the recesses 54.

As the insertion of the bar 6 into the recess 20 occurs, the contact portions 36 engage the exposed conductors 84 of the cable, causing a wiping action between the terminals and the conductor, thereby insuring that a proper electrical connection will be effected.

When the alignment bar 6 is fully inserted into the recess 20 of the housing 4, the resilient arms 32 of the terminals generate a significant force on the conductors. This insures that the alignment bar 6 will be maintained in position, and that the electrical connection between the terminals and the cable will be reliable over time.

With the alignment bar 6 properly positioned in the housing 4, the molded liner 8 and strain relief member 10 are positioned over the cable 80. The strain relief member 10 provides a means to lock the assembly together. The locking arms 64 of the strain relief member 10 are positioned in the openings 40 of sections 42 of housing 4, such that the resilient securing projections 66 are provided in the recesses 44. The cooperation of the projections 66 and recesses 44 insures that the assembly will remain in the locked position.

Connector assembly 2 is mated with a mating connector to provide the electrical path required between the cable and a printed circuit board or the like.

Changes in construction will occur to those skilled in the art and various apparently different modifications and embodiments may be made without departing from the scope of the invention. The matter set forth in the foregoing description and accompanying drawings is offered by way of illustration only.

We claim:

1. An alignment tool for use in positioning terminals in an electrical connector, the alignment tool comprising:

a rearward surface and a forward surface, and end walls and side walls extending from the rearward surface to the forward surface;

terminal receiving recesses extending toward the rearward surface first to transverse bottom surfaces from the forward surface, and extending there beyond along the side walls, with dividers separating them;

positioning means positioned on the end walls, the positioning means cooperate with the electrical connector to insure that the alignment tool is properly positioned relative to the connector when the alignment tool is moved into cooperation with the connector.

2. An alignment tool as recited in claim 1 wherein the alignment tool is modular, such that the alignment tool can be modified to allow the tool to be used for various sizes of connectors.

3. An alignment tool as recited in claim 1 wherein the alignment tool is manufactured from precision ground steel so that the manufacturing tolerances can be minimized thereby enabling the tool to maintain the precise spacing required.

4. An alignment tool as recited in claim 1 wherein the terminal receiving recesses are dimensioned to accept terminals therein, the terminals frictionally engage bottom surfaces of the terminal receiving recesses to maintain the terminals in position relative to the alignment tool, dividing walls are provided between the terminal receiving recess to prevent the movement of the terminals.

5. An alignment tool as recited in claim 4 wherein the center line spacing of the terminal receiving recess is approximately 0.02 of an inch.

* * * * *